(No Model.)

A. & C. W. BOYNTON.
SAW.

No. 308,549. Patented Nov. 25, 1884.

Witnesses:
Jas. F. DuHamel.
Walter S. Dodge

Inventors:
Alfred Boynton,
Charles W. Boynton,
by Dodge & Son,
Attys.

UNITED STATES PATENT OFFICE.

ALFRED BOYNTON, OF BATTLE CREEK, MICHIGAN, AND CHARLES WILSON BOYNTON, OF BROOKLYN, NEW YORK; SAID CHARLES W. BOYNTON ASSIGNOR TO L. E. BOYNTON, OF BROOKLYN, NEW YORK.

SAW.

SPECIFICATION forming part of Letters Patent No. 308,549, dated November 25, 1884.

Application filed October 11, 1884. (No model.)

*To all whom it may concern:*

Be it known that we, ALFRED BOYNTON, of Battle Creek, county of Calhoun, State of Michigan, and CHARLES W. BOYNTON, of Brooklyn, in the county of Kings and State of New York, have invented certain new and useful Improvements in Saws, of which the following is a specification.

Our invention relates to saws, and is designed as an improvement upon the well-known "lightning" saw, made under patents No. 59,951 and No. 73,226.

The present invention consists in arranging the teeth in groups of four, each tooth having one upright or nearly perpendicular face and one inclining face, the upright faces being turned outward, or away from the middle of the group, and the teeth being alternately beveled on opposite faces and set in opposite directions. In other words, the present group is in effect and appearance the same as would be produced by superimposing one of the M-teeth of the above-mentioned lightning saw upon another with the points or individual teeth of one alternating with those of the other. Clearer-teeth may be employed between each two groups or between each two pairs of groups, as desired.

Figure 1:
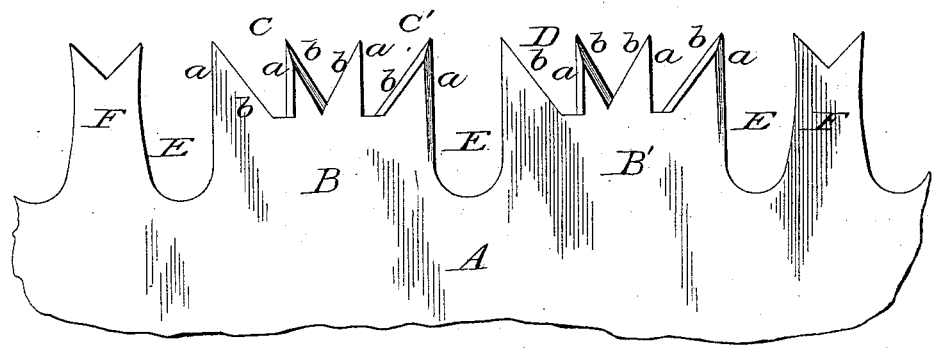
Figure 2:
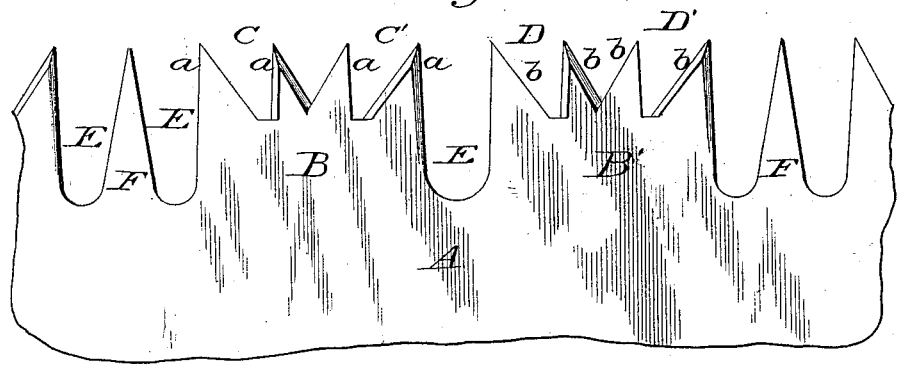
Figure 3:
Figure 4:
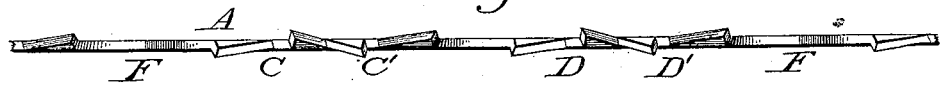

Figure 1 is a face view of our improved saw in the preferred form; Fig. 2, a similar view of the same in a substantially similar or equivalent form; Figs. 3 and 4, edge views of the same.

It is found in practice that the most efficient cutting is done by perpendicular or nearly perpendicular faces of cutting-teeth, and to this formation is attributed much of the success of the saw already referred to. It is, however, observed that, owing to the fact that both points of the M-tooth of said saw are beveled and set in the same direction with reference to the length of the blade, there is a tendency of the teeth to be drawn off out of their proper line of cut, thereby materially increasing the friction and impairing the efficiency of the saw. To remedy this it has been proposed to make the saw with teeth having three points, the outer ones having perpendicular faces and the intermediate one of V shape, the teeth being dressed and set alternately in opposite directions; but, owing to the unequal number of points and to the difference in form, this fails to correct the evil mentioned. Again, it has been proposed to form a saw with the ordinary V-teeth in groups, dressed and set alternately in opposite directions, with dust or clearance spaces between the groups. Various other plans have been proposed, including a variety of special forms of teeth; but the construction which gives by far the best results of any we have yet tried is that above mentioned, and now more fully explained with the aid of the drawings.

A indicates a saw-blade or a section thereof provided with groups B B of teeth C, C', D, and D', each having a perpendicular or substantially perpendicular face or edge $a$ and inclined face or edge $b$, as plainly shown in the drawings. The teeth C and C' form together the M-tooth of the lightning saw, and the teeth D D' likewise form such an M-tooth; but they are beveled or dressed on opposite sides or faces and set in opposite directions. Thus point or tooth C is beveled on the face toward the observer, but it is set in the opposite direction, or away from the observer. Point or tooth D is beveled or dressed on the face away from the observer, but set toward him. Tooth C' is dressed and set the same as tooth C, and tooth D' the same as tooth D. In this way we have alternate teeth, reversed as to their dress and set, and each serving to counteract and perfectly balance its companion when in action, whichever way the saw may be moving. Between each group and the next we form a clearance space or opening, E, and within each opening or each alternate opening, according to the character and intended use of the saw, we form a raking or clearing tooth, F, which may be of M form, as in Fig. 1, or of V form, as in Fig. 2. The essential features of the invention, however, consist in forming the teeth in groups of four points or a multiple thereof, each point having an upright or perpendicular face turned away from the middle of the group, the points being set alternately in opposite directions and beveled or dressed on opposite faces alternately.

Eight, twelve, or sixteen teeth may be arranged in the manner described; but the number should be four or a multiple thereof to insure a perfect balance and even action.

Having thus described our invention, what we claim is—

1. A saw having teeth consisting of points arranged in groups, each point having a substantially-perpendicular face on the side away from the middle of the group, said points being dressed or beveled, and set alternately on opposite faces and in reverse directions.

2. The herein-described saw, consisting of a blade provided with teeth or cutting-points arranged in groups with intermediate clearing-spaces, each point having a substantially perpendicular face on the side farthest from the middle of the group, the teeth being alternately dressed and set in opposite directions, and the clearance-spaces being provided regularly or alternately with raking or clearing teeth, substantially as and for the purpose set forth.

ALFRED BOYNTON,
CHARLES WILSON BOYNTON.

Witnesses:
ALONZO K. PRENTICE.
TOLMAN W. HALL.